United States Patent [19]
Reppert

[11] Patent Number: 6,092,259
[45] Date of Patent: Jul. 25, 2000

[54] INTERIOR WINDSHIELD CLEANING SYSTEM

[76] Inventor: Gregory D. Reppert, 634 N. Fair St., Allentown, Pa. 18102

[21] Appl. No.: 09/226,027

[22] Filed: Jan. 6, 1999

[51] Int. Cl.⁷ .................................. B60S 1/30; B60S 1/46
[52] U.S. Cl. .................................... 15/250.04; 15/250.28; 15/250.29; 15/250.4
[58] Field of Search ........................... 15/250.28, 250.29, 15/250.04, 250.4, 250.11, 103, 250.24, 250.41

[56] References Cited

U.S. PATENT DOCUMENTS

| | | | |
|---|---|---|---|
| 1,339,241 | 5/1920 | Tripp . | |
| 2,160,099 | 5/1939 | Zeligman et al. | 15/250 |
| 2,253,029 | 8/1941 | Hart | 15/253 |
| 3,108,307 | 10/1963 | Redrow | 15/250.28 |
| 3,120,672 | 2/1964 | Costanzo | 15/250.28 |
| 4,023,422 | 5/1977 | Jou et al. | 74/70 |
| 4,754,517 | 7/1988 | Aldous | 15/250.04 |
| 5,315,735 | 5/1994 | I-Shin | 15/250.22 |

*Primary Examiner*—Gary K. Graham
*Attorney, Agent, or Firm*—Henderson & Sturm

[57] ABSTRACT

A cleaning system 10 for the interior surface of a vehicle windshield 100 wherein the system 10 comprises a wiper blade unit 11 adapted to be mounted adjacent the interior surface of a windshield and moved back and forth with respect thereto under the influence of a drive unit 13. The wiper blade unit 11 includes a blade carrier element 21 provided with a pair of wiper blade elements 22, 23, and a plurality of fluid apertures 24 which are arrayed to produce a metered amount of cleaning fluid to the wiper blade elements 22, 23.

11 Claims, 1 Drawing Sheet

U.S. Patent
Jul. 25, 2000
6,092,259
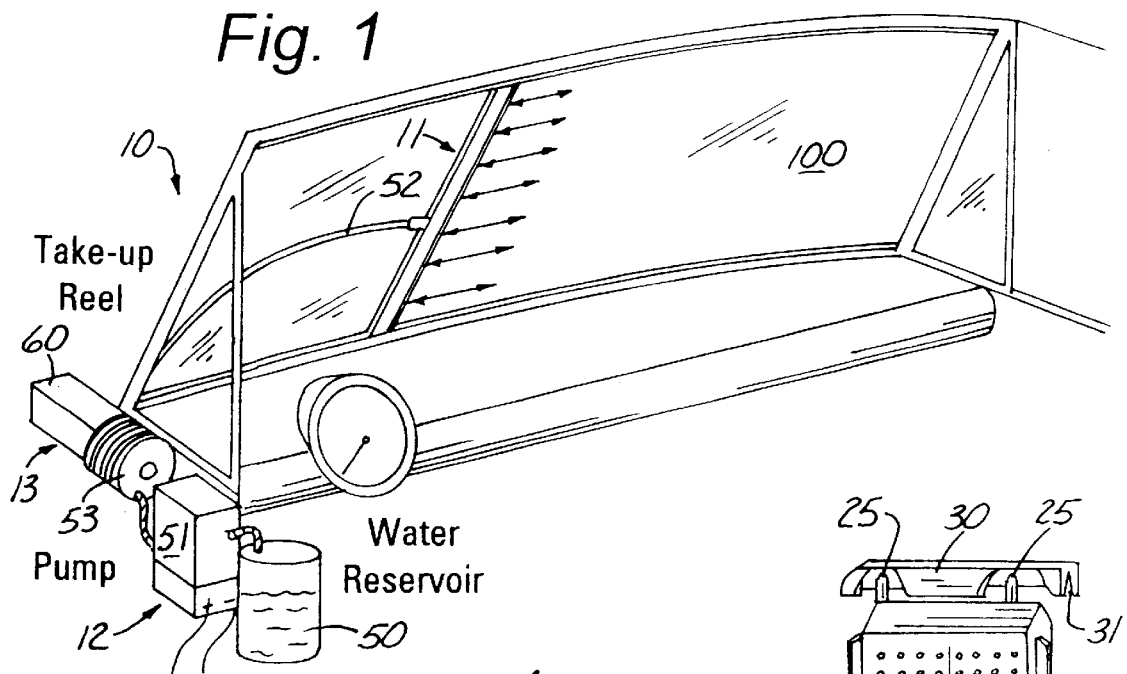
Fig. 1
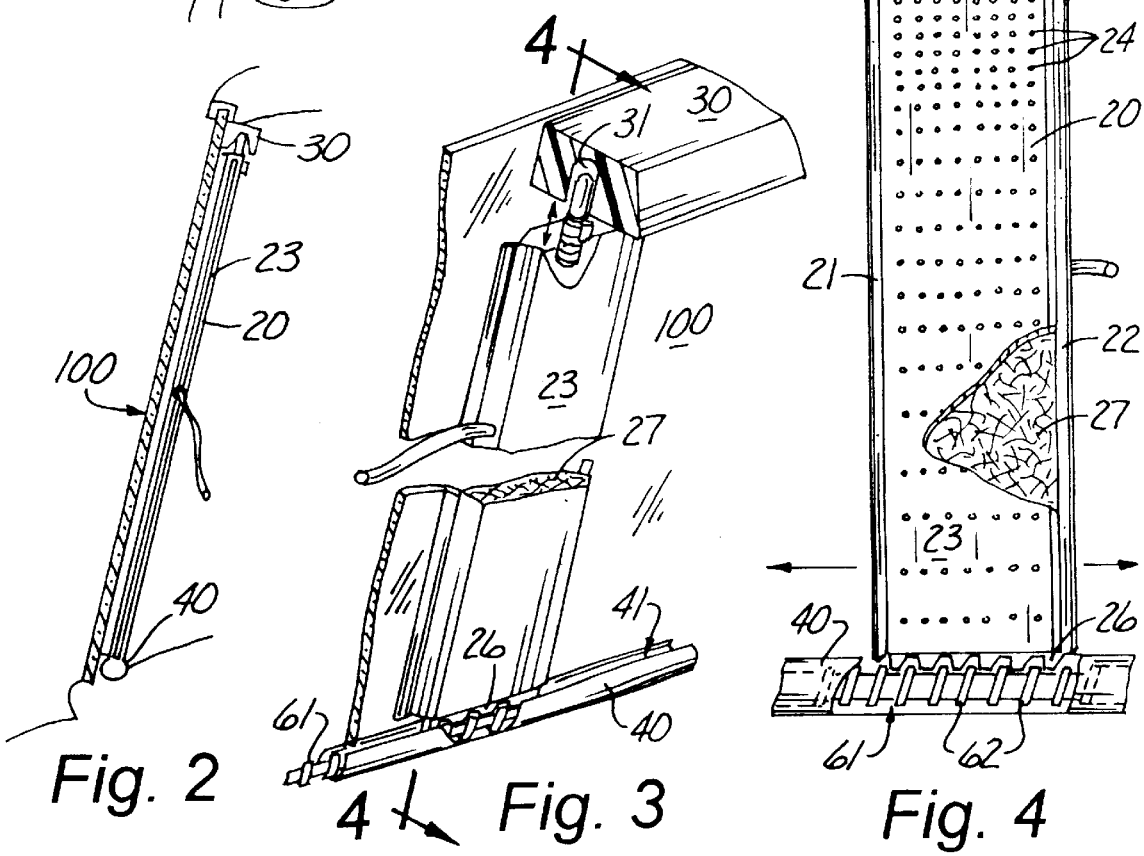
Fig. 2
Fig. 3
Fig. 4

INTERIOR WINDSHIELD CLEANING SYSTEM

BACKGROUND OF THE INVENTION

1. Field of the Invention

The present invention relates to the field of vehicle windshield cleaning systems in general, and in particular to a metered flow windshield cleaning system for the interior surface of a vehicle window.

2. Description of Related Art

As can be seen by reference to the following U.S. Pat. Nos. 2,160,099; 2,253,029; 3,108,307; 4,023,422; and 5,315,735, the prior art is replete with myriad and diverse windshield wiping systems.

While all of the aforementioned prior art constructions are more than adequate for the basic purpose and function for which they have been specifically designed, they are uniformly deficient with respect to their failure to provide a simple, efficient, and practical system for cleaning the interior of the windshield of a vehicle.

As most adults who take care of their vehicles, and in particular smokers, are all too well aware, one of the most difficult tasks in maintaining the appearance of their vehicle is the chore of cleaning the outwardly angled surfaces of the interior of the vehicle windshield. While the exterior windshield surface is readily accessible, it is extremely difficult to gain access to the lower interior windshield surface for the purpose of cleaning.

As a consequence of the foregoing situation, there has existed a longstanding need for a new and improved type of interior windshield cleaning system that is mechanized and has a metered cleaning fluid delivery to a windshield wiper element, and the provision of such a construction is a stated objective of the present invention.

BRIEF SUMMARY OF THE INVENTION

Briefly stated, the interior windshield cleaning system that forms the basis of the present invention comprises in general, a wiper blade unit, a fluid supply unit, and a drive unit. The wiper blade unit comprises a wiper blade member adapted to be moved back and forth across the interior surface of a vehicle windshield while dispensing a metered flow of cleaning fluid to a pair of wiper blade elements.

As will be explained in greater detail further on in the specification, the wiper blade member includes a blade carrier element provided with a pair of oppositely by facing wiper blade elements on its opposite sides while the windshield contacting fare of the blade carrier element is provided with a staggered aperture array wherein substantially more cleaning fluid is delivered to the upper portion of the wiper blade member than the lower portion.

In addition, the upper and lower portions of the blade carrier element are suspended and supported in a guide track member and a drive track member which are affixed adjacent to the upper and lower portions of the interior surface of the vehicle windshield.

Furthermore, both the fluid supply unit and the drive unit are operatively connected to a reversible motor which both moves the wiper blade member and both unreels and retracts a fluid supply hose extending between a fluid supply reservoir and the wiper blade member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the interior windshield cleaning system installed in the interior of a vehicle;

FIG. 2 is a cross sectional view as viewed from one end of the windshield;

FIG. 3 is an isolated perspective view of the cleaning blade member upper guide member and lower drive member; and FIG. 4 is a cross sectional view taken through line 4—4 of FIG. 3.

DETAILED DESCRIPTION OF THE INVENTION

As can be seen by reference to the drawings, and in particularly to FIG. 1, the interior windshield cleaning system the that forms the basis of the present invention is designated generally by the reference number 10. The system 10 comprises in general, a wiper blade unit 11, a fluid supply unit 12, and a drive unit 13. These units will now be described in seriatim fashion.

As can best be seen by reference to FIGS. 3 and 4, the wiper blade unit 11 comprises a wiper blade member designated generally as 20. The wiper blade member 20 includes a pair of wiper blade elements 21, 22 extending outwardly at an angle from the opposite sides of an elongated ported wiper blade carrier element 23 which is dimensioned to extend from the top to the bottom of the interior surface of a windshield 100.

In addition, the blade carrier element 23 is provided with a plurality of discrete apertures 24 preferably arrayed in spaced rows of apertures wherein the spacing of the rows of apertures 24 increases from the top to the bottom of the blade carrier element 23 for reasons that will be explained in greater detail further on in the specification; and the apertures 24 in turn are covered by a sponge element 27 which contacts the windshield surface.

Still referring to FIGS. 3 and 4, it can be seen that the wiper blade unit 11 further includes a guide track member 30 operatively connected to both the upper portion of the windshield and the upper portion of the blade carrier element 23. The interior of the guide track member 30 is provided with a channel 31 that is dimensioned to slidably receive a pair of post elements 25 which project upwardly from the top of the blade carrier element 23.

In addition, the wiper blade unit 11 further includes a drive track member 40 operatively connected to both the lower portion of the windshield 100 and the lower portion of the blade carrier element 23. The interior of the drive track member 40 is provided with a channel 41 that is dimensioned to slidably receive a toothed skirt 26 which depends downwardly from the bottom of the blade carrier element 23.

Turning now to FIGS. 1 through 3, it can be seen that the fluid supply unit 12 comprises a fluid supply reservoir 50 which is operatively connected to pump 51 for delivering cleaning fluid to the sponge element 27 of the wiper blade member 20 Via an elongated length of flexible tubing 52 which is retracted and extended relative to a take up reel 53 as the cleaning blade member 20 moves back and forth across the interior of the windshield in response to the actuation of the drive unit 13 as will be explained presently.

As can best be seen by reference to FIGS. 1, 3, and 4, the drive unit 13 comprises a reversible direction drive motor 60 operatively associated with both the take up reel 53 and a drive shaft member 61 which is dimensioned to be rotatably received in the drive track member 40. The drive shaft member 61 is provided with a worm gear surface 62 that is dimensioned to receive the toothed skirt 26 on the bottom of the blade carrier element 23 such that as the drive shaft member 61 is driven in one direction, the wiper blade member 20 will be moved in one direction as the take up reel 53 pays out the flexible tubing 52. As the drive shaft member 61 is driven in the opposite direction, the take up reel 53 reels in the flexible tubing 52 as the wiper blade member 20 moves in the opposite direction.

At this juncture, it should be noted that as shown in FIG. 4, the wiper blade elements 21, 22 are angled in opposite direction such that the sponge element 27 and trailing blade depending on the direction of motion of the blade carrier element 23 performs the wiping function whereas, the staggered and progressively spaced fluid aperture array on the blade carrier element 23 is designed to supplement the fluid flow through the lower aperture rows with the cleaning fluid that is being fed by gravity from the upper fluid apertures 24 and which thoroughly wets the wiper sponge element 27.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. In a vehicle having a windshield with an interior surface and an exterior surface, a windshield cleaning system for the interior surface of a vehicle windshield, wherein the cleaning system comprises:

a wiper blade unit including: a wiper blade member, including a blade carrier element provided with at least one wiper blade element wherein the blade carrier element is further provided with a plurality of spaced fluid apertures covered by a wiper sponge element; a guide track member operatively connected to an upper portion of the interior of the windshield and operatively associated with an upper portion of the blade carrier element; and a drive track member operatively connected to a lower portion of the interior of the windshield and operatively associated with a lower portion of the blade carrier element;

first means for supplying fluid through said fluid apertures to said wiper sponge element; and second means for moving the blade carrier element back and forth relative to the guide track member and the drive track member.

2. The system as in claim 1 wherein said blade carrier element is provided with a pair of wiper blade elements disposed on opposite sides of the blade carrier element.

3. The system as in claim 2 wherein said pair of wiper blade elements project outwardly from the carrier blade element and are angled away from one another.

4. The system as in claim 3 wherein said plurality of apertures are arranged in spaced rows.

5. The system as in claim 4 wherein said spaced rows are spaced at increasing intervals from the top to the bottom of said blade carrier element.

6. The system as in claim 5 wherein the upper portion of the blade carrier element is provided with a plurality of post elements which are slidably received in the guide tack member.

7. The system as in claim 6 wherein the lower portion of the blade carrier element is provided with a toothed skirt which is dimensioned to be slidably received in the drive track member.

8. The system as in claim 7 wherein said second means comprises a reversible drive shaft member that is rotatably received in said drive track member and adapted to engage the toothed skirt on the lower portion of the blade carrier element.

9. The system as in claim 8 wherein said first means and said second means are operatively associated with a reversible drive motor.

10. The system as in claim 9 wherein said fluid supply unit includes a fluid supply reservoir connected to a fluid pump which is operatively connected to the blade carrier element by a length of flexible tubing.

11. The system as in claim 10 wherein said length of flexible tubing is disposed on a take up reel which is operatively connected to said reversible drive motor.

\* \* \* \* \*